United States Patent [19]

Lalvani

[11] Patent Number: 5,036,635
[45] Date of Patent: Aug. 6, 1991

[54] BUILDING SYSTEM USING SADDLE ZONOGONS AND SADDLE ZONOHEDRA

[76] Inventor: Haresh Lalvani, 92 Horatio St., New York, N.Y. 10014

[21] Appl. No.: 428,018

[22] Filed: Oct. 26, 1989

Related U.S. Application Data

[63] Continuation of Ser. No. 319,861, Mar. 6, 1989, abandoned, which is a continuation of Ser. No. 88,308, Aug. 24, 1987, abandoned.

[51] Int. Cl.$^5$ ................................................ E04B 1/32
[52] U.S. Cl. .................................... 52/8; 52/DIG. 10
[58] Field of Search ...................... 52/81, 80, DIG. 10

[56] References Cited

U.S. PATENT DOCUMENTS

| | | | |
|---|---|---|---|
| 3,600,825 | 8/1971 | Pearce | 35/18 A |
| 3,925,941 | 12/1975 | Pearce | 52/82 |
| 3,931,697 | 1/1976 | Pearce | 52/80 |
| 4,133,152 | 1/1979 | Penrose | 52/105 |
| 4,620,998 | 11/1986 | Lalvani | 428/33 |

OTHER PUBLICATIONS

Pearce, Structure in Nature is a Strategy for Design, pp. 86–121, 122–127, 224–226, 1978.

*Primary Examiner*—Henry E. Raduazo
*Attorney, Agent, or Firm*—Roylance, Abrams, Berdo & Goodman

[57] ABSTRACT

A building system composed of space-filling convex and non-convex saddle zonogons which fit together periodically and non-periodically into a variety of orderly and irregular looking space structures including saddle zonohedra, single-, double- and multi-layered structures, multi-directional space-filling structures and curved space labyrinths. The saddle zonogons are derived from the infinite class of plane zonogons, and the saddle zonohedra from the infinite class of plane-faced zonohedra. The surfaces of the saddle polygons could be continuously curved surfaces of faceted polygonal surfaces derived from minimal surfaces. The curved surfaces could be flexible membranes or nets in tension used by themselves or in combination with space frames, or stiff shell-like surfaces, and the edges could be hinged or fixed to others. Applications of the system include architectural and environmental structures, fixed or retractable space frames, decks or platforms, educational kits or toys, curved tiles, and saddle polyhedra nodes for space frames.

25 Claims, 10 Drawing Sheets fig.1 fig.2 fig.3

BUILDING SYSTEM USING SADDLE ZONOGONS AND SADDLE ZONOHEDRA

This is a continuation of application Ser. No. 07/319,861, filed Mar. 6, 1989, which is a continuation of application Ser. No. 07/088,308, filed Aug. 24, 1987, now abandoned.

FIELD OF THE INVENTION

The invention relates to building systems. More specifically, the invention relates to periodic and non-periodic building systems using saddle zonogons and saddle zonohedra.

INTRODUCTION AND PRIOR ART

The architectural environment has been, and it still is, dominated by plane surfaces and straight lines. These fall within the realm of Euclidean geometry. Plane curves, as in arches, and curved surfaces in vaulted ceilings and domes, have been known for centuries and provide a necessary counterpoint to the rectilinear spaces. The domed surface, which is generally a sphere, is an example of a non-Euclidean surface since the sum of the angles of a triangle on this surface is greater than 180°, while in plane geometry this sum is 180°. Such surface has a positive curvature while the plane has zero curvature. There is another class of surfaces which has a negative curvature and where the sum of the angles of a triangle is less than 180°. An example is the well-known hyperbolic paraboloid, or the hyperboloid of the nuclear power plants, or the pseudosphere. Non-Euclidean geometries were formalized in the last century and the names Lobachevsky, Bolyai, Gauss and Reimann are associated with it. The spherical and the hyperbolic surfaces are doubly-curved. However, the two surfaces are different if we visualize them as being generated by two curves moving over one another. In spherical and ellipsoidal surfaces, the two generating curves are curved in the same way, while in the hyperbolic surfaces, the two curves are curved in opposite directions. The former are termed "synclastic", and the latter "anti-clastic", and both are curved space structures.

Though synclastic surfaces have been more commonly used in architecture, the use of anti-clastic surfaces has been increasingly seen only in the past three decades. The Catalan architect, Antonio Gaudi, first recognized its inherent structural potential as a "naturally" stiff or stronger surface, and his later work in the twenties molded the surfaces of stone into series of four-sided hyperbolic paraboloids in irregular compositions or linearly periodic arrays. Felix Candela, in Mexico in the fifties, used "hypars" (from hyperbolic paraboloids) as thin shell concrete structures in arrays of squares and a regular undulated octagon. Frei Otto in Germany, also in the fifties, used the minimal surface notion to develop his membrane structures. His studies with tensile fabric used single even-sided regular polygons with zig-zag edges in tension. Michael Burt in Israel, and Peter Pearce in the U.S., independently showed a systematic study of periodic saddle structures based on symmetry. Burt's saddle polyhedra, and their space-fillings, are derived from regular and semi-regular polyhedra and their space-fillings, and have equal edges. Pearce's saddle polyhedra and their space-fillings are based on the cubic symmetry of his universal node system and use three lengths of edges. In marked contrast to these, some of Frei Otto's tent structures are non-modular and use irregular plane geometries to achieve architectural flexibility, an idea which is desirable in architecture. Vittorio Giorgini achieved this by using asymmetric shells of compound curvatures.

In addition to saddle polyhedra, a new class of continuous periodic minimal surfaces were independently reported by Alan Schoen, Michael Burt and Peter Pearce. These are continuous saddle surfaces without self-intersections that divide space into two congruent or complementary spaces. The first example of a curved space labyrinth was discovered by Schwartz. A four-dimensional Schwartz surface was developed by David Brisson. A few additional curved labrinths based on packings of Platonic and Archemedian polyhedra were disclosed by Lalvani. The plane-face and straight-edge structures related to these were reported jointly by Burt, Wachman and Kleinmann and are based on packings of regular and semi-regular polyhedra. These are composed only of regular polygons and are termed "infinite polyhedra". The known curved space labyrinths are based on the high degree of symmetry of periodic space networks from which they are derived and correspond to prismatic, tetrahedral and cubic symmetries where the prismatic symmetries correspond to the space-fillings of regular prisms, and the other two as their name suggests.

Prior art in curved space structures has two basic directions. The first using the non-modular, custom-tailored approach where the parts of a structure are shaped in response to architectural, functional, structural or aesthetic needs, which necessitate an inherent flexibility in shaping spaces and where irregular plans, even in rectilinear buildings, are a result. In contrast to this, the thrust of industrialization in building has led to the notion of using mass-produced identical parts for a built-in economy of design, production, construction, etc. This has led to the use of periodic structures based on symmetry. In the latter again there are two approaches—one based on regular structures having equal edges and equal angles, as in the case of Burt, and the other developing a "unified" building system using at least three types of edges (lengths) but permitting recombinations of the same parts into a large variety of configurations as in the case of U.S. Pat. Nos. 3,600,825, 3,925,941 and 3,931,697 to Pearce. Clearly, the latter approach is successful in providing a "flexible" system, and hence a flexibility in the configurations it produces. But both approaches, exploiting the advantages of periodicity to a great extent, have built-in restrictions. Periodicity is forced on the spaces generated, the spaces have "predetermined" proportions based on the symmetry from which they are derived, and many of the spaces have the regularity imposed by spherical or prismatic point groups of symmetry. Some of these properties may be advantageous in some situations and the experience of a sense of order and beauty that symmetry brings is desirable. But all periodic building systems reinforce the advantages of periodicity and deny irregular plans, or departures in directions of spaces here and there, and other such devices a designer finds useful. The repetitive nature of periodic structures often removes the element of surprise and intrigue in architecture, resulting in a loss of visual and experiential interest by users and observers.

The art of building would be furthered if all the advantages of periodicity were retained, and yet the irregularity was made possible, the proportions and shapes of space were not "dictated" by regular polygons, regular and semi-regular polyhedra, or proportions determined by high symmetry groups. The present disclosure is aimed in this direction. It uses modularity—one length of edge only as one possibility—excludes the use of space structures with regular polygons, permits any desired proportions of spaces, permits infinite families of structures, permits periodic arrangements, and most important of all, it makes non-periodic, random-looking arrangements possible out of the same modules. The modules are based on minimal surfaces or its deformations and use a variety of saddle shaped components. A modular system that permits non-periodic curved space structures is not mentioned in prior art, and a system that permits both periodic and non-periodic arrangements out of the same curved modules is also not mentioned in prior art.

U.S. Pat. No. 4,133,152 to Roger Penrose is cited for disclosing a non-periodic plane tiling based on pentagonal symmetry. U.S. Pat. No. 4,620,998 to H. Lalvani is cited for disclosing periodic and non-periodic plane tilings using crescent-shaped polygons.

SUMMARY OF THE INVENTION

A building system is disclosed composed of space-filling convex and non-convex saddle zonogons which fit together periodically and non-periodically into a variety of orderly and irregular looking space structures including saddle zonohedra, single-, double- and multi-layered structures, multi-directional space-filling structures and curved space labyrinths. The saddle zonogons are derived from the infinite class of plane zonogons, and the saddle zonohedra from the infinite class of plane-faced zonohedra. The surfaces of the saddle polygons could be continuously curved surfaces or faceted polygonal surfaces derived from minimal surfaces. The curved surfaces could be flexible membranes or nets in tension used by themselves or in combination with space frames, or stiff shell-like surfaces, and the edges could be hinged or fixed to others. Applications of the system include architectural and environmental structures, fixed or retractable space frames, decks or platforms, educational fits or toys, curved tiles, and saddle polyhedra nodes for space frames.

DRAWINGS

Referring now to the drawings which form a part of this original disclosure.

DETAILED DESCRIPTION OF THE INVENTION

Figure 1:
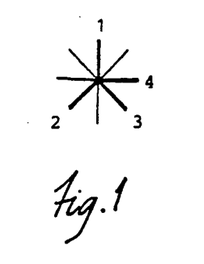
FIG. 1 is a top plan view of a planar 4-star, a star with four vectors; based on a regular octagon.
Figure 2:
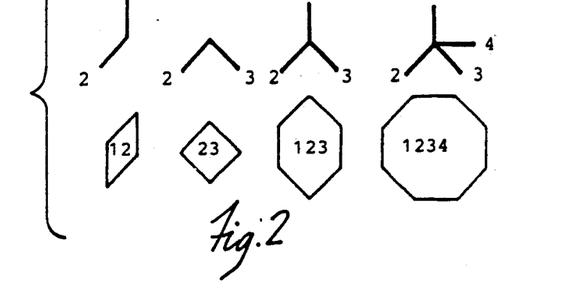
FIG. 2 shows the top plan view of four zonogons which include two rhombii, one hexagon and one octagon, all comprising a family of polygons based on FIG. 1.

As seen in a planar star with four equal unit vectors 1, 2, 3, and 4 radiate from the center of a regular octagon seen in top plan view. The angle between any pair of vectors of a planar n-star, a star of n co-planar vectors, is a whole number multiple of the central angle of a 2n-sided regular polygon. Here n=4, and the central angle of the octagon equals 360°/8, or 45°. The angle between vectors 1 and 2 equal 3 times 45° or 135°, the angle between vectors 2 and 3 equal 2 times 45° or 90°, and the angle between vectors 3 and 4 equal 1 times 45° or 45°. Each distinct combination of p vectors of an n-star, where p=2, 3, 4, 5, 6, . . . n, makes a convex polygon with even number of sides. Such polygons, termed "zonogons" have their edges parallel to p vector directions, and their angles clearly equal the angles between vectors as described above. The distinct polygons for the 4-star described are shown in FIG. 2. 12 and 23 are two rhombii with p=2, 123 is a hexagon with p=3, and 1234 is a regular octagon with p=n. These four polygons constitute a family of zonogons with n=4.

Figure 3:
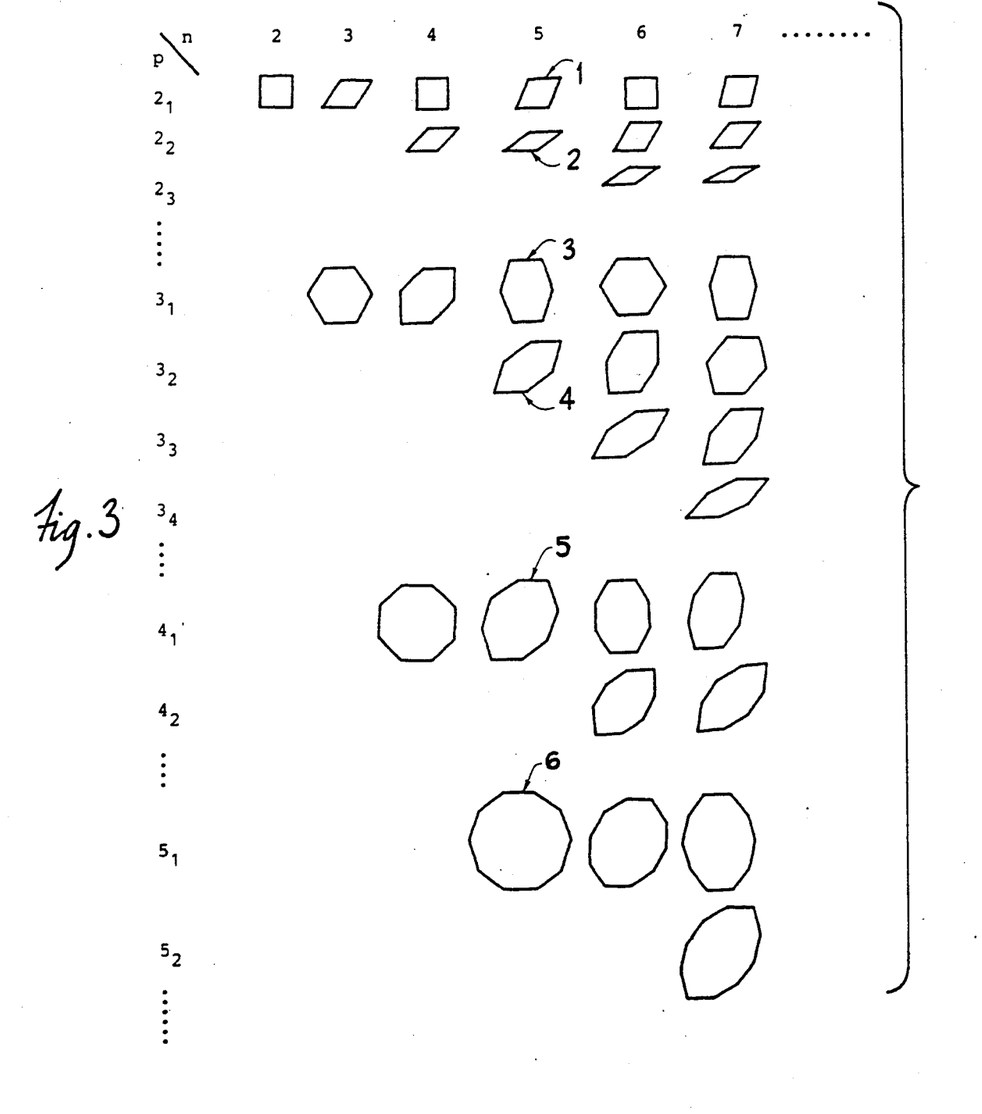
FIG. 3 shows a table of plane zonogons in their top plan view based on the infinite family of planar n-stars, each n-star comprising a finite family of p-stars, where p=2, 3, 4, 5, 6, 7 . . . n, and which generates a corresponding finite family of zonogons with 2p sides; the table shows some examples for n=2 through 7.

Zonogons from regular polygonal n-stars are tabulated in FIG. 3. The degenerate cases, p=0,1, are not shown. p=2 is an infinite class of rhombii $2_1, 2_2, 2_3, \ldots$, p=3 is an infinite class of hexagons $3_1, 3_2, 3_3, \ldots$, p=4 is an infinite class of octagons, $4_1, 4_2, 4_3, \ldots$, p=5 is an infinite class of decagons, $5_1, 5_2, 5_3, \ldots$, and so on. All face angles of rhombii and zonogons are multiples of $180°/n$. The rhombii are the building blocks of all higher zonogons which can be decomposed into their respective rhombii in various ways. Regular even-sided polygons are generated when p=n; these are special cases with 2n-fold symmetry and are zonogons $2_1, 3_1, 4_1, 5_1, \ldots$ in FIG. 3. They are also produced when n=x.p, where x is a whole number. Regular polygons have only one type of and equal edges. The other zonogons have more than one type of face angle, and are less regular. The four zonogons from n=4 shown in FIG. 2 can be seen here in the column index 4.

For n=5 case, there are six zonogons as illustrated in FIG. 3. There are two rhombii 1 and 2, two hexagons 3 and 4, one octagon 5, and one regular decagon 6. Their face angles are whole number multiples of 36°. Rhombus 1 has angles 2 and 3, i.e., 2 times 36° (=72°) and 3 times 36° (=108°); rhombus 2 has angles 1 (36°) and 4 (144°); hexagon 3 has two types of angles 3 and 4, hexagon 4 has angles 2 and 4; octagon 5 has angles 3 and 4; and the decagon has angle 4 only. These angles are given particularly, since the following examples in FIGS. 4-8 use these six zonogons in their plan views as an illustrative example which use one family of polygons for one value of n.

Zonogons from stars based on regular polygons have been shown. Zonogons from arbitrary stars can be similarly derived. Here the angles between vectors will be chosen arbitrarily, and the lengths of the vectors may be unequal.

Figure 4:
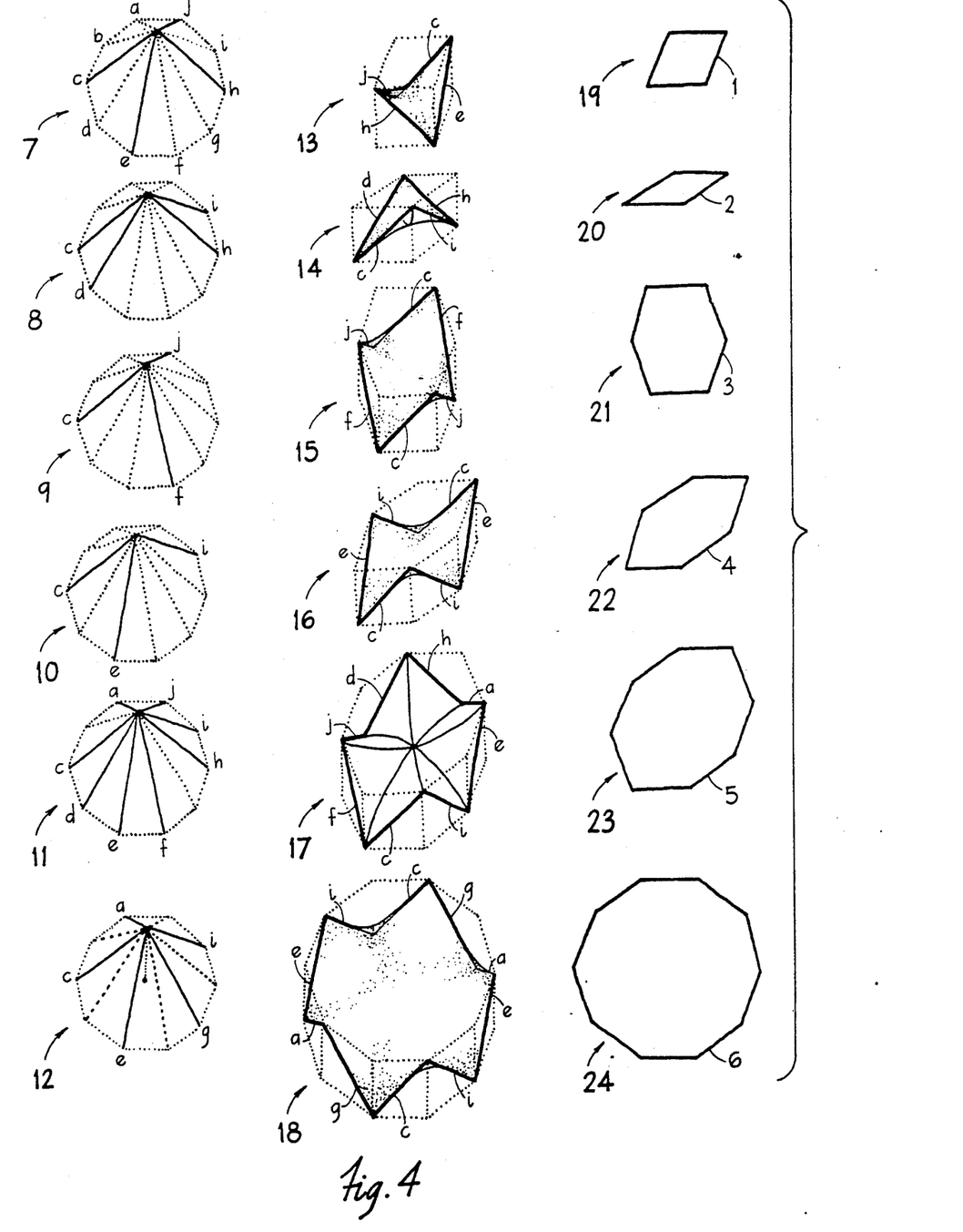
FIG. 4 shows saddle zonogons, along with their plan views, based on six different vector combinations derived from a 10-star determined by the inclined sides of a 10-sided having a regular decagonal base.

The saddle structures as disclosed in the invention are derived from non-planar or spatial n-stars. FIG. 4 shows six different p-stars 7-12 for n=10, all based on vectors determined by the directions of the inclined edges of a decagonal pyramid. The base of the pyramid is a regular decagon, and its apex lies vertically above the center of the decagon at any distance. The 10 vectors are numbered a-j in a counterclockwise sequence beginning from the top left vertex. What is shown is six combinations of vectors 7-12 from this 10-star, such that the plan views of the saddle zonogons generated by edges parallel to these vector combinations are the plane zonogons 1-6 in FIG. 3. The corresponding saddle zonogons 13-18 are shown alongside, with their corresponding top plan views 19-24. The combination of p vectors are shown in heavy line in the p-stars 7-12, and the dotted lines indicate their position relative to other latent vectors.

P-star 7 has 4 vectors c, e, h, and j and produces the saddle rhombus 13 with the edges marked as shown and with the plan view 19. 8 is another 4-star with p=4 and vectors c, d, h, and i which produce the saddle rhombus 14 with the plan view 20. 3-star 9, having vectors c, i, and j, produces a saddle hexagon 15 with the top plan view 21. 3-star 10, having vectors c, e, and i, produces another saddle hexagon 16 with the top plan view 22. 8-star 11, having vectors a, c, d, e, f, h, i, and j, produces a saddle octagon 17 with a top plan view 23. 5-star 12, having vectors a, c, e, g, and i, produces a decagonal saddle 18 with a top plan view 24.

Figure 5:
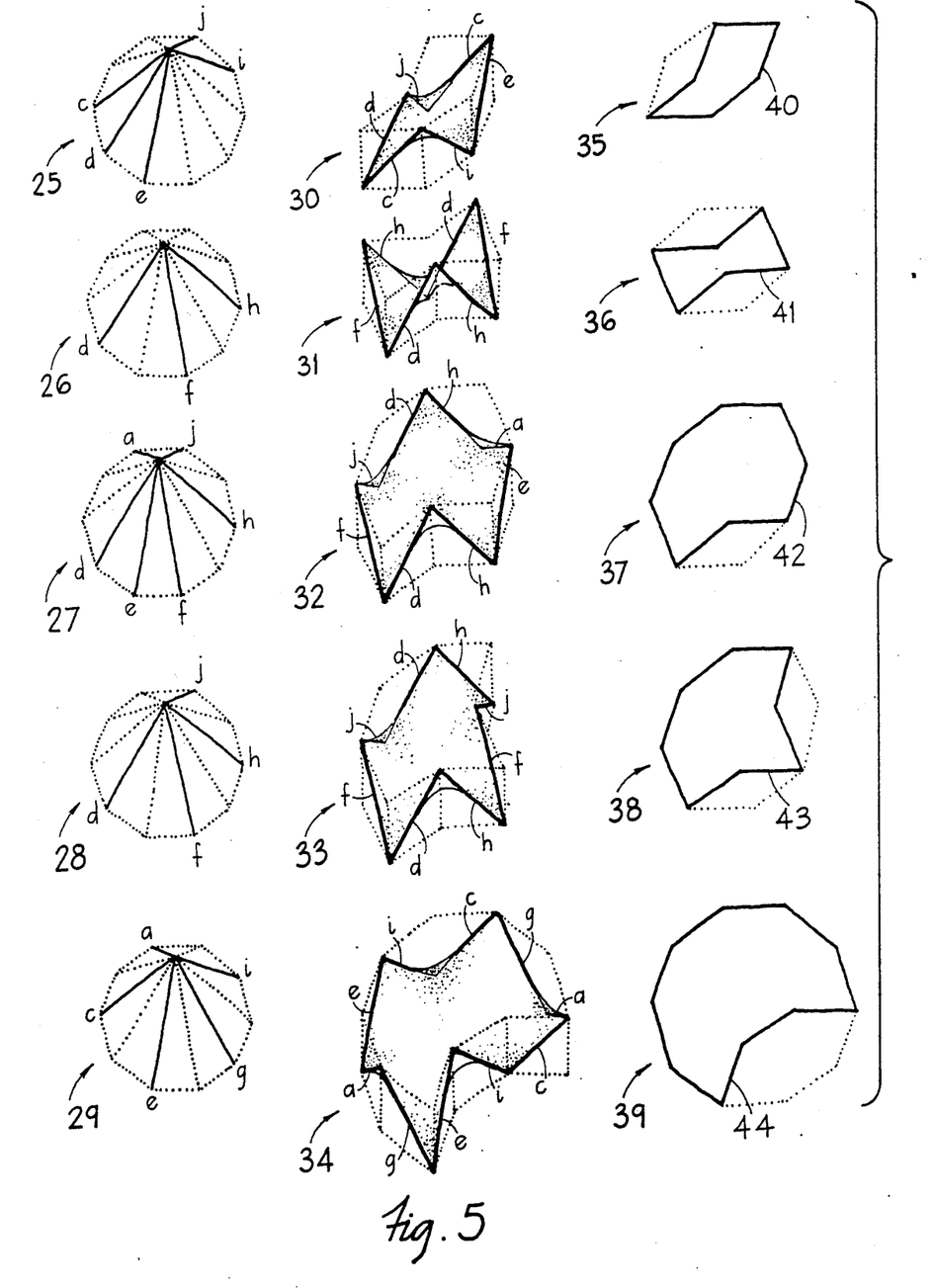
FIG. 5 shows non-convex saddle polygons, along with their plan views, based on five different vector combinations derived from the same 10-star of FIG. 4.

The same 10-star can produce non-convex saddle polygons, having plan views of non-convex polygons, and edges parallel to p vectors. Five examples are shown in FIG. 5.

5-star 25, having vectors c, d, e, i, and j, produces a non-convex saddle hexagon 30 with edge directions as indicated, and with a top plan view 35 shown a non-convex hexagon 40 also obtained by subtracting the rhombus 2 from the hexagon 4.

3-star 26, having vectors d, f, and h, produces the non-convex saddle hexagon 31 with edge directions as indicated, and with top plan view 36 showing a bow-shaped hexagon 41, also obtained by subtracting two of rhombii 2 from the hexagon 3.

6-star 27, having vectors a, d, e, f, and j, produces a non-convex saddle octagon 32 with edge directions as indicated, and with a plan view 37 showing an asymmetric octagonal crescent 42 obtained by subtracting the rhombus 2 from the octagon 5.

4-star 28, having vectors d, f, h, and j, produces a non-convex saddle octagon with edge directions as indicated, and with a top plan view 38 showing a kite-shaped octagon 43, also obtained by subtracting two of rhombii 2 from the octagon 5.

5-star 29, having vectors a, c, e, g, and i, produces a non-convex saddle decagon with edge directions as indictated, and with a top plan view 39 showing a decagonal crescent 44, also obtained by subtracting the hexagon 4 from the decagon 5.

Clearly, other vectors combinations will produce other convex and non-convex saddle polygons, and pyramids with any odd or even number of sides greater than three could be used as a basis for other non-planar star. Since FIGS. 4 and 5 have used a non-planar n-star and have produced structures with top plan views derived from a planar star, as shown in FIG. 3, the precise relationship between the two types of stars needs to be clarified. If the planar star is an m-star, it is related to the non-planar n-star as follows: When n is odd, based on a pyramid with a base having odd number of sides, m=n. When n is even, as in the case of the decagonal pyramid used in FIGS. 4 and 5, m=n/2, i.e., the planar star is based on five vector directions for the 10 vector direction of the pyramidal star.

Another point of clarification is the relation of the pyramidal star to stars obtained from other figures. The pyramidal star is also the star obtained from prisms and anti-prisms by joining their centers to their vertices. This is briefly explained. The 10-star from the decagonal pyramid is also a prismatic star by connecting the center of a pentagonal right prism to its vertice. This can be visualized by extending the alternating five vectors beyond the apex of the pyramid. The five extended vectors above the apex, along with the remaining five unextended vectors below the apex define a pentagonal prism. However, if the vectors of an odd-sided pyramid are extended, the top vectors along with the bottom vectors define a pentagonal anti-prism. Thus, the vector stars, determined by the inclined edges of p odd-sided and 2p even-sided pyramids are also stars obtained by joining the center of a p-sided anti-prism and a p-sided prism to its vertices, respectively.

That is, the infinite class of stars from the edges of pyramids correspond to the infinite classes of stars obtained from prism and anti-prisms.

It is important to mention this, since the pyramidal star is not just a non-planar star, but it is a spatial star and can be used to produce zonohedral structures. Conversely, the spatial stars used later to produce zonohedra will also produce saddle polygons.

Figure 6:
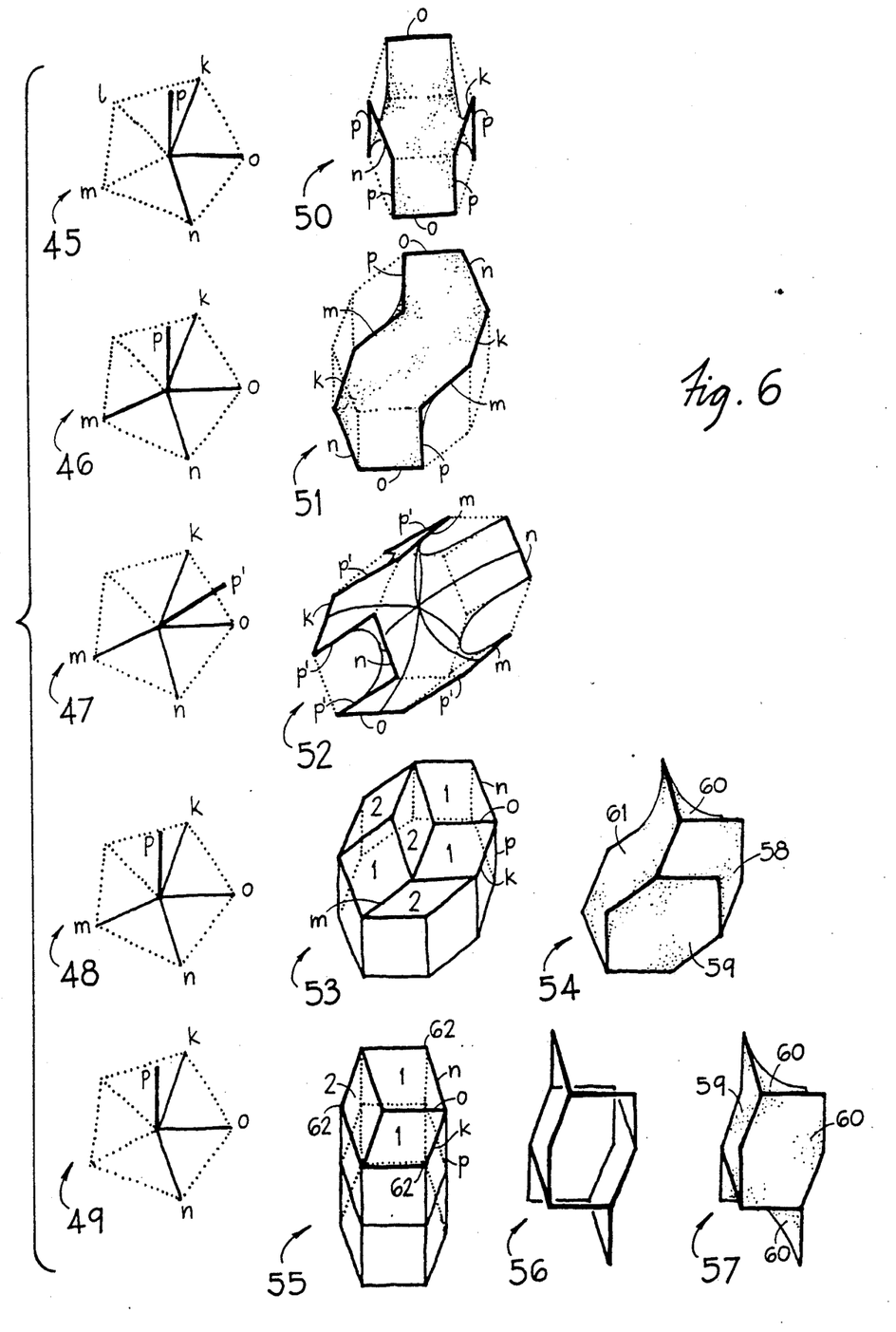
FIG. 6 shows two saddle polygons, and two saddle polyhedra, one derived from a single-layered subdivided octagonal prism and the other from a double-layered hexagonal prism, each based on vector combinations of a 6-star, five of which lie on a plane regular pentagon and one orthogonal to it; also shown is one oblique variant from an oblique 6-star.

Now we show examples of structures derived from another related figure, the bi-pyramid, having two pyramids back to back, and the duality of the prism. This is also an infinite class of figures, and produces infinite class of corresponding stars. Saddle structures based on one example are shown in FIG. 6, and are based on a pentagonal bi-pyramid, where the n-star joins its center to its vertices where n is any number greater than four. Since the vectors joining the center to the two apices are co-linear, only the top half of the bi-pyramidal star is shown. In the figures, it looks like another variation of a pyramidal star. (See 45).

It has five co-planar vectors k, l, m, n, and o joining the center of a pentagon to its five vertices. A sixth vector p is perpendicular to these five and joins the center of the pentagon to an apex defining a pentagonal pyramid. This makes a 6-star with n-6.

A 4-star combination 45 with p=4, and having vectors k, n, o, and p produces the saddle hexagon 50, with edge directions as indicated, and with a plan view of hexagon 3. This saddle has six vertical edges p joining three edges k, n, and o on the top plane to three alternating edges, also parallel to k, n, and o vectors, but lying on the bottom plane.

A 5-star combination with p=5, and having vectors k, m, n, o, and p produces the octagonal saddle 51 with edge directions as indicated and with a plan view of octagon 5. This saddle has two vertical edges p which connect the two halves of the octagon, with one half lying on the top plane and the other on the bottom plane.

The 5-star combination 47 is a variant of the 5-star 46. The upright vector p has tilted to an oblique position p', while the four planar vectors have remained unchanged. It produces a tilted saddle, defined by an oblique octagonal prism, and having eight slanted verticals p' joining four edges on the top plane to four alternating edges on the bottom plane.

Since this 6-star is also a spatial star, a somewhat degenerate one since all but one of its vectors are planar, it can generate a special class of Zonohedra, namely zonogonal prisms. Zonohedra are a special class of convex polyhedra composed of zonogonal faces and edges parallel to n vectors. The faces are arranged in parallel pairs with each pair related by the symmetry of inversion. The general case is where all the faces are rhombii, and the use of higher zonogons are special cases where several rhombii have "fused" into one polygon. As in the 2-d case, all distinct combinations of p vectors (p=3, 4, 5, 6, 7, 8, ... n) produce a family of zonohedra. The p=3 case produces the minimum building blocks terms 'rhombohedra', composed of 3 pairs of parallel rhombii arranged in the shape of a sheared cube having edges parallel to 3 directions. The p=4 case, generated from a 4-star produces a rhombic dodecahedron composed of 12 rhombii. The p=5 case produces a rhombic icosahedron with twenty faces. The p=6 case, generated from a 6-star, produces a rhombic triacontahedron with thirty faces, and so on. The number of faces are given by the known expression $n(n-1)$.

Here two examples of zonogonal prisms are shown. From these, polyhedra with saddle polygons are derived. Zonohedra with saddle polygons are here termed saddle Zonohedra.

5-star 48 is identical to 46. Here it is used to produce an octagonal prism 53 with a plan view of the octagon 5, the top plane of which is subdivided into three of rhombii 1 and three of rhombii 2 ... and the bottom plane is undivided. This subdivision makes 53 a zonohedron composed of rhombii, from which any set of contiguous rhombii can be removed to produce convex and non-convex boundaries within which a saddle surface can be spanned. This produces a saddle zonohedra having a set of co-planar edges on the top and bottom plane. 54 is an example of a saddle zonohedron from 53 and is composed of a non-convex hexagon 58 replacing two adjacent rhombii, two convex hexagons 59 and 60 each replacing three rhombii, and a saddle octagon 62 replacing six rhombii.

4-star 49 is identical to 45, but produces the double layered hexagonal prism 55 with the edge directions as marked and with the top hexagon 3 subdivided into two of rhombii 1 and one of rhombus 2. The arrangement produces 3 tri-valent vertices 62 with three edges and three faces meeting at each. Each q-valent vertex can be replaced by 2q-sided saddle polygons as seen in the wire-frame skeleton 56, where the bottom half is the same but turned through 180°. It produces a saddle zonohedron 57 composed of two hexagons 59, and four hexagons 60.

In the examples of the saddle polygons in FIGS. 4-6, including the two examples of saddle zonohedra 54 and 57, the emphasis has been to retain their top plan view in correspondence with the infinite families of rhombii and zonogons in FIG. 3. This is an important constraint, and the feature of this invention is to use the plane-filling properties of the rhombii and zonogons to produce planar arrays of saddle polygons and saddle zonohedra. The rhombii, zonogons, the non-convex polygons fit together by themselves in some cases, and with others from the same family in many cases to fill a plane periodically and non-periodically. This property is used in the saddle structures. Four examples are shown in FIG. 7 along with one variant.

Figure 7:
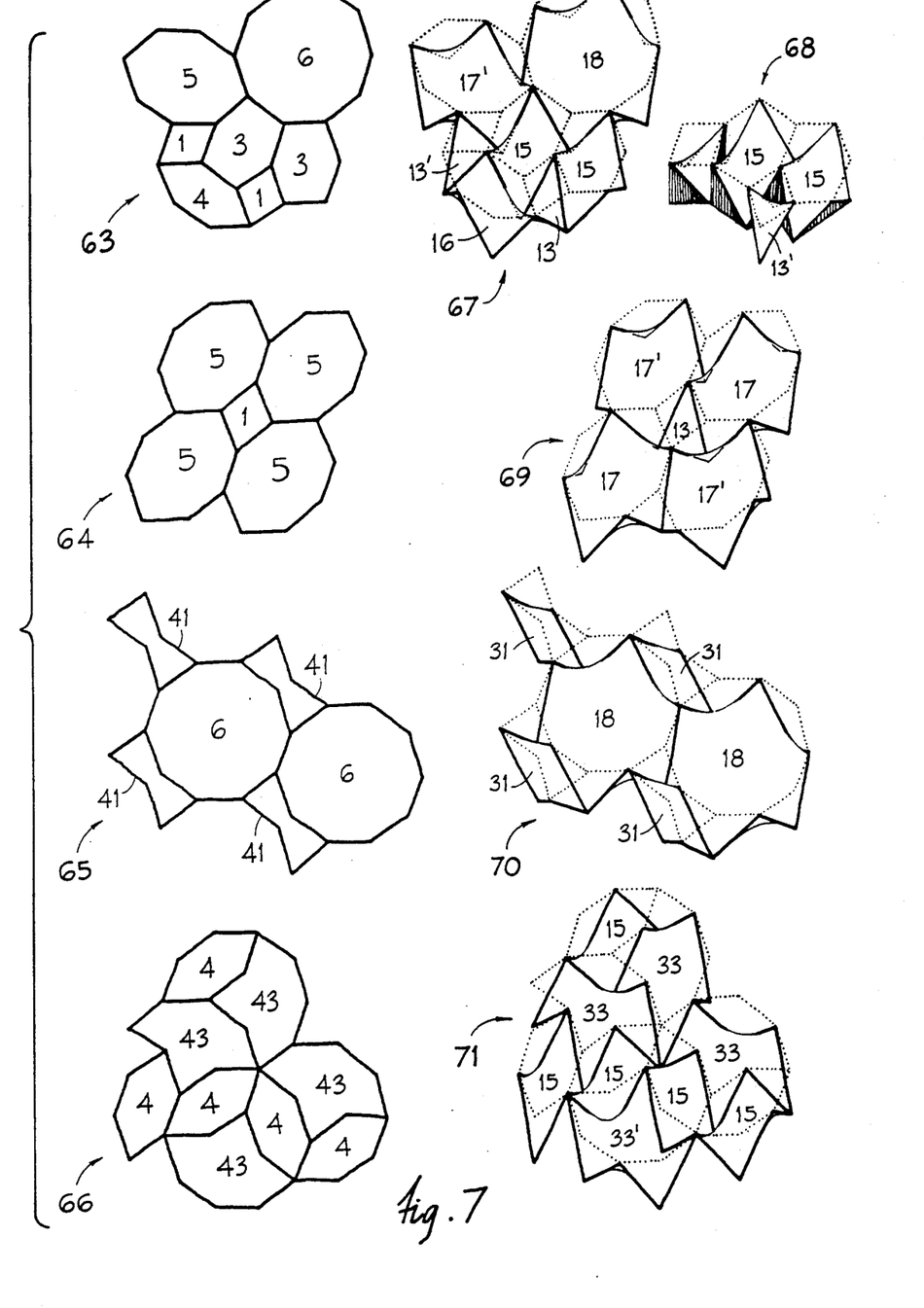
FIG. 7 shows four examples of planar arrays of saddle polygons; one using four types of convex saddles in a non-periodic arrangement, another using two types of convex saddles in a periodic array, another periodic array with convex and non-convex saddles, and a non-periodic arrangement of convex and non-convex saddles all having a continuous undulating surface; also shown is one example using a discontinuous surface.

FIG. 7 shows a plurality of convex and non-convex saddle polygons in planar periodic and non-periodic arrays. 63-66 are top plan views showing the convex and non-convex polygons being used in each example. 67-71 show the corresponding saddle polygons filling a plane.

63 is a plan view using five different convex polygons, the rhombus 1, the hexagons 3 and 4, the octagon 5 and the decagon 6 in a non-periodic arrangement. 67 is a corresponding plane-filling of saddle zonogons 13, 15, 16, 17, and 18. Also used are 13' and 17' which are upside-down versions of 13 and 17. The adjacent saddle zonogons share a single edge and make a continuous surface. However, any saddle zonogons can be replaced by its upside version leaving its neighbors unturned. This produces a discontinuous surface as shown in 68 where the rhombus 13 has been changed to 13' leaving the two neighboring hexagons 15 unchanged. Compare this with the bottom right portion of the array in 67. The shaded portions in 68 also indicate that the saddle surfaces could be exterior curved surfaces from prisms and can be used as tiles.

64 is a plan view using two types of convex zonogons, the rhombus 1 and the octagon 5, in a periodic array. The corresponding saddle polygons are shown in 69, which uses the saddles 13 and 17, along with their upside down versions 13' and 17'.

65 is a plan view using two types of polygons, a non-convex hexagon 41 and a regular decagon 6 in a periodic arrangement. The corresponding array of saddle polygons 31 and 18 is shown in 70.

66 is a plan view showing two types of polygons, a convex hexagon 4 and a non-convex octagon 43 in a non-periodic arrangement. Their corresponding saddle polygons 15 and 33 fit together as shown in 71, wherein the upside down saddle polygon 33' is necessary to retain a continuous surface.

These are only four examples of planar arrays of convex and non-convex saddle polygons in periodic and non-periodic arrangements, and corresponding to the 10-star from the edges of a decagonal pyramid. Not only can a large variety of other combinations and possibilities be derived from these and other saddle polygons within this family, but an equally large number would also be possible for other values of n and p from the two types of spatial n-stars described so far.

Also, it is clear that since the top plan views of the saddle polygons 50 and 51, and other related saddle polygons from the same 6-star 45 and having plan views corresponding to the family of six plane zonogons of n=5 in FIG. 3, planar arrays of such saddles can be produced corresponding to the plan views 63-66. The arrays could be tilted using saddle modules related to 52. Or planar arrays would likewise be possible from the saddle zonohedra 54 and 57 and their relatives derived from the same 6-star. Another, also it is clear that any planar array can be stacked in layers to fill space, where the layers are connected by plane or saddle polygons.

Figure 8:
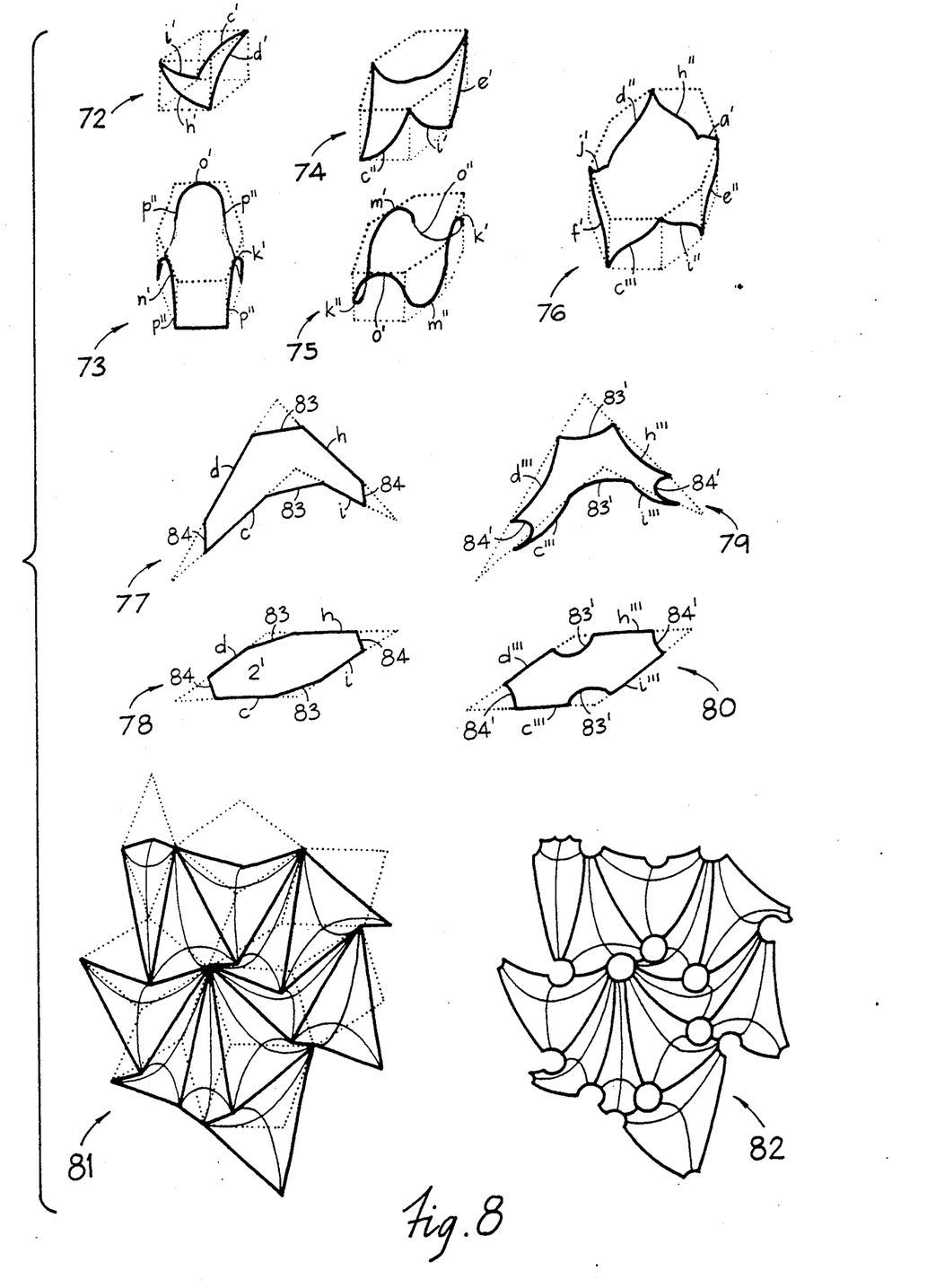
FIG. 8 shows variants of saddle polygons by curving edges in a variety of ways, or combining curved edges with straight edges, or truncating the vertices of saddle polygons; one example of a non-periodic array of saddle rhombii along with its curved variant with truncated vertices is shown; as an illustrative example.

A large number of variations of the saddle zonogons are possible. These include curving edges in various ways, combining curved edges with straight edges, truncating or cutting off the corners of the saddles, varying the heights and angles, and so on. A few possibilities are illustrated in FIG. 8, and other variations can be made along these lines.

72 is a variant of the saddle rhombus 14'. The upside-down version of; the edges c, d, h, i curve to c', d', h', and i'.

73 is a variant of the saddle hexagon 50 where the upright edges p have changed to p'' with lowered height, and the top edges k, n, and o have been converted into arched curves k', n', and o'.

74 is a variant of the saddle hexagon 16, where the original edges c, e and i have been curved downwards to c', e' and i'.

76 is a variant of the saddle octagon 17 where the edges have become sine-waves.

77 is a truncated version of the saddle rhombus 14. The edges c, d, h and i remain the same but shortened, new edges 83 are introduced on the top, and new edges 84 are introduced at the bottom. 78 is the corresponding top plan view, where the rhombus 2 changes to the truncated rhombus 2'.

79 is a curved variant of 77, where the top edges 83 and the bottom edges 84 curve along the horizontal plane to 83', and 84' respectively. And the edges c, d, h, and i curve inwards.

One example corresponding to the curved variant 79 is shown in 82 for a non-periodic array of saddle rhombii shown in 81.

81 uses four types of rhombii, 13, 14, 13', and 14', and in its top plan view it has the two rhombii 1 and 2 based on the Penrose tiling. The edge directions of the saddle are parallel to the 10-star we saw earlier in FIGS. 4 and 5. Replacing each saddle rhombus with the curved variant 79 produces 82, wherein the holes are at the raised and lowered points.

Now we discuss the most complex of all n-stars, here termed polyhedral stars, obtained by joining the center of any polyhedron to its vertices. Technically speaking, all the stars described earlier excepting the planar stars are polyhedral stars, but is is merely a matter of classification that we discuss these separately. The unique property of these stars is they are "multi-directional", while the pyramidal and prismatic stars are "multi-layered". Here three classes of polyhedral stars are disclosed. For each one zonohedron and some saddle zonohedra are shown in FIG. 9.

The three classes of polyhedral n-stars used in this invention are:
  i) determined by any arbitrary or irregular polyhedron having equal vectors lying on a sphere with n greater than three;
  ii) any regular or semi-regular polyhedron with 2n vertices with n greater than 4;
  iii) any arbitrary polyhedron with unequal vectors with n greater than three.

Figure 9:
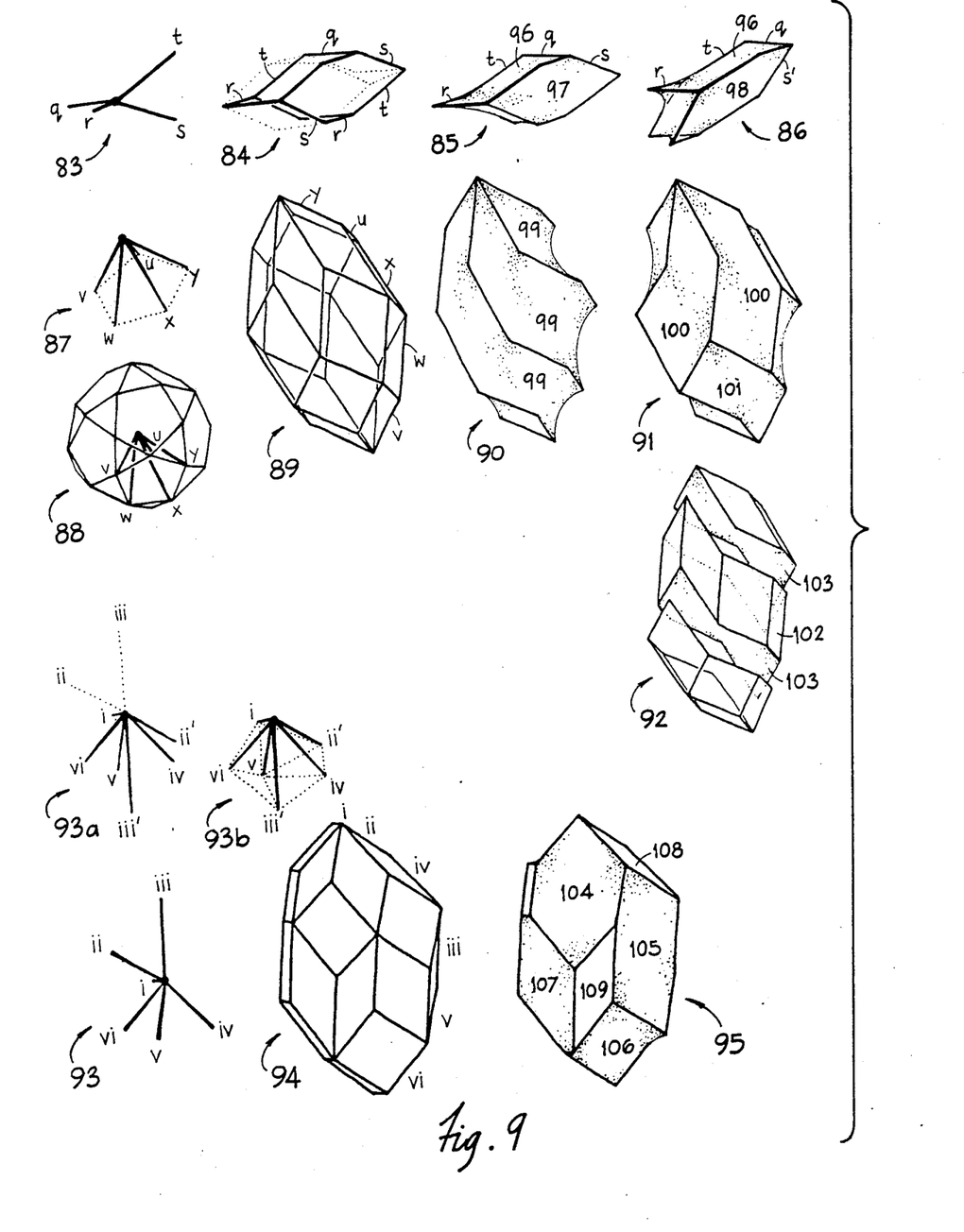
FIG. 9 shows saddle zonohedra derived from three classes of polyhedral stars, one from an arbitrary 4-star with equal vectors, one from a 15-star based on a semi-regular polyhedron, and one on an arbitrary 6-star with unequal vectors.

As seen in Fig. 9, 83 is a 4-star based on an arbitrary tetrahedron and having 4 equal vectors q, r, s, and t. It produces a zonohedron 84 from the four vector directions and all its edges are parallel to these four directions. The directions of four of its edges are marked. This particular zonohedron is a deformed rhombic dodecahedron, where the undeformed one is a well-known Archimedean dual polyhedron. The three rhombii surrounding each of its four tri-valent vertices are replaced by four saddle hexagons producing an irregular saddle tetrahedron 85. The present invention discloses the use of any arbitrary star with equal vectors, and with any value of n greater than three. A variant of 85 is shown in 86, where three of the four vectors, i.e., r, t, and q, have remained unchanged, and the vector s has changed to s'. The saddle hexagon 96 remained unchanged, while the saddle hexagon 97 changes to 98. This suggests that any other variation in the vectors would produce another saddle tetrahedron. Clearly, all four vectors can be changed in an infinite variety of combinations, liberating the restriction of regularity with predetermined angles to any desired proportion of space or structure. For each n-star, there are thus infinite positions, and hence an infinite variety of saddle structures can be produced for each value of n.

In marked contrast to this is a family of stars derived from any regular or semi-regular polyhedron. Since all the vertices of these polyhedra lie on the same sphere, this class of polyhedral stars are special cases of the one mentioned above. Here the zonohedron where p=n retains the spherical symmetry of the parent polyhedron from which the star is derived. But values of p less than n are less regular, though a few still retain some sub-symmetry. The present disclosure uses these zonohedra as an intermediary step to derive saddle polyhedra. One example of p=5 from n=15, based on the 5 star derived from the icosidodecahedron, a well-known Archimedian polyhedron composed of alternating pentagons and triangles, is shown in 87 and 88, where the five vectors u, v, w, x, and y in 87 correspond to one pentagonal face of the icosidodecahedron as seen in 88. The five vectors produce the zonohedron 89 with 20 rhombic faces, with edge directions as indicated by five outer edges, and where all other edges are parallel to these five edges. Two saddle zonohedra are shown in 90 and 91 derived by replacing sets of contiguous rhombii by a saddle polygon, as we did earlier to derive the saddle polyhedra 54 and 57. The saddle polyhedron 90 has a sinuous strip of rhombii removed and replaced by a non-convex saddle decagon 99. It has five such saddles in a five-fold rotational symmetry along the axis joining the two pointed apices. The saddle polyhedron 91 replaces every pair of adjacent rhombii by two types of non-convex saddle hexagons 100 and 101. It has 10 such saddle hexagons. 92 is the decomposition of this zonohedron 89 through saddle polygons lying on its interior. This particular example has two parallel saddle hexagons 103 forming a saddle prism 102. The latter combines saddle faces with plane faces.

Only two examples of saddle polyhedra from the p=5 zonohedron of one semi-regular polyhedron has been shown. Other saddle polyhedra from this and other values of p can be derived for each regular or semi-regular polyhedron. The present system uses such polyhedra with 2n vertices with n greater than 4. This excludes three of the regular polyhedra, the tetrahedron, the octahedron and the cube. The remaining two, the icosahedron and the decahedron, and the 13 Archimedean polyhedra can be used to derive an extremely large variety of saddle polyhedra by the method described. In addition, one polyhedral star can be combined with another to produce hybrid n-stars from which other saddle zonohedra can be derived.

The third type of n-star is shown in FIG. 93 with one example of n=6. It is based on six unequal vectors i, ii, iii, iv, v, and vi at arbitrary angles. It generates the zonohedron 94 with p=n=6 and having 30 faces, where the six edge directions are indicated and where other edges are parallel to these six. This zonohedron is an irregular variant of the known Archimedean dual, the rhombic triacontahedron. One irregular saddle polyhedron 95 is obtained by selectively replacing eight of the twenty tri-valent vertices by saddle hexagons 104–107, where all are irregular and different, and there are four on the other side in an inverse symmetry. In addition, this polyhedron has six plane rhombii, two each of 108–110. The structure is an irregular saddle variant of the known semi-regular polyhedron, the truncated octahedron. Clearly, there would by infinite such arbitrary 6-stars, each producing their own uniquely deformed saddle zonohedra. This entire class of arbitrary n-stars, further removes the restrictions of regularity already greatly reduced, by the first class of arbitrary but equal vectors. This produces modular saddle structures with unequal edges and arbitrary angles, and is the furthest from regular structures. In the present disclosure, not only is the regularity of the angles and lengths removed, but when such regularity is used as a starting point, as in the second class of polyhedral stars based on symmetric polyhedra, the end result is not regular at all, as any arbitrary composition of convex and non-convex saddle polygons can be derived.

Figure 10:
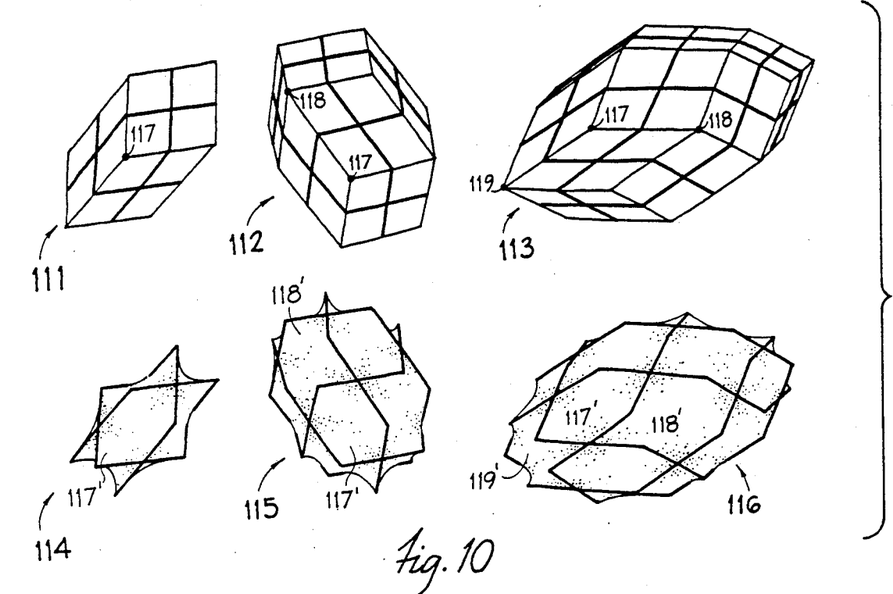
FIG. 10 shows the saddle polyhedra derived by superimposing a dual on three different zonohedra and replacing the original faces with saddle polygons.

Before going to the space-fillings and packings produced by the saddle zonohedra just described, one systematic method for generating an orderly class of saddle zonohedra is described. These retain the general irregular-look of the rhombohedra and zonohedra. Examples are illustrated in FIG. 10 for three zonohedra 111–113, based on p or n equal to 3, 4, and 5, respectively. In each one tri-valent vertex 117 is marked, the 4-valent vertices 118 are marked in 112 and 113, and a 5-valent vertex 119 is marked in the zonohedron 113. In each a dual network is superimposed. This is shown in heavy line in the three figures, and essentially produces a cross on each rhombic face such that the edges of the cross remain parallel to the edges of the zonohedron. Further, this cross is co-planar with the rhombic faces, so that when the lines of the cross carry over to the adjacent rhombus, the edges bend. The zonohedron is subdivided and each rhombus has become four smaller rhombii. Now we apply the same device for obtaining saddle polygons, replacing a tri-valent vertex 117 by a saddle hexagon 117', a 4-valent vertex 118 by a saddle octagon 118', a five-valent vertex by a saddle decagon, and so on. In general, a v-valent vertex is replaced by a 2v-sided saddle polygon, where v equals 3, 4, 5, 6, 7 . . . with an upper limit of n and v is the general valency of a vertex in a zonohedron. The corresponding saddle polyhedra 114–116 are derived this way.

Figure 11:
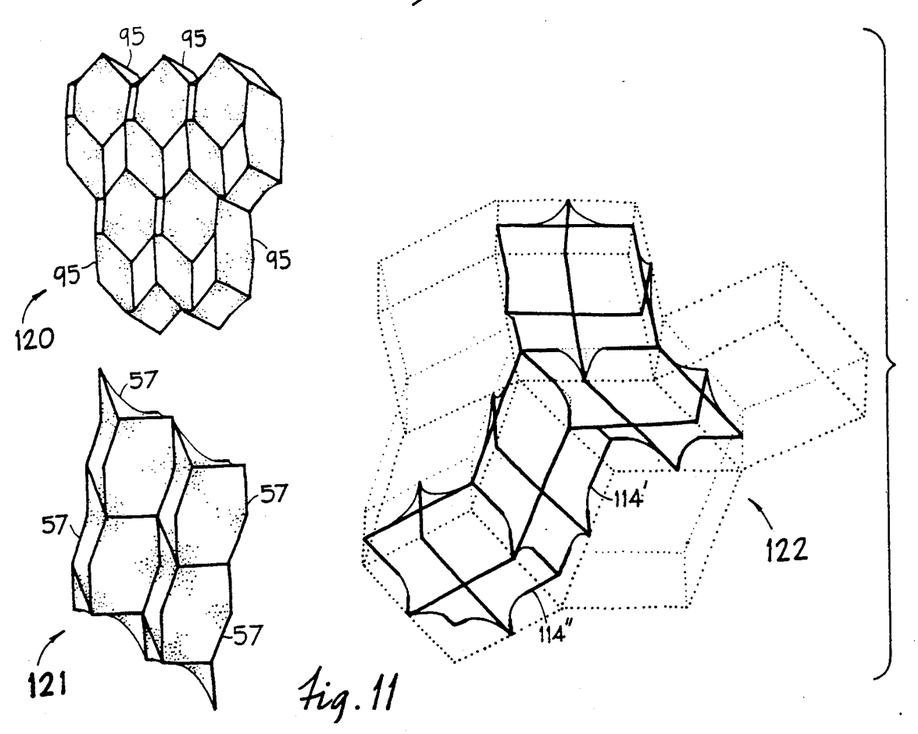
FIG. 11 shows three examples of space-fillings, a periodic one based using a self-packing saddle polyhedron with eight saddle hexagonal faces and six plane rhombic faces, another periodic one based on a double-layered saddle polyhedron with six saddle hexagons, and a non-periodic packing using similar looking saddle polyhedra each with eight saddle hexagons, and inscribed within rhombohedra of at least two types.

The saddle zonohedra from each of the three types of stars described pack together to fill space periodically and non-periodically. Three examples are shown in FIG. 11. The space-filling 120 uses the saddle polyhedron 95 by itself to fill space periodically. The space-filling 121 uses the double-layered saddle polyhedron 57 to fill space periodically. It is an example of a multi-layered space-filling. It is easy to imagine that single-, double-, triple-layered arrangement can be easily derived. Since the plan view of the module 57 of this space filling corresponds to the plan hexagon 3, similar modules can be derived for the other zonogons, and non-periodic space-fillings corresponding to the plan views 63–66 can be made possible. Also, half of this module 57, above or below its mid-plane, along with others like the saddle polyhedron 54, can also be used to produce single-layered structures with plan views corresponding to 63–66.

The space-filling 122 is a non-periodic packing of at least two types of saddle polyhedra 114' and 114''. The dotted lines indicate positions of neighboring cells where additional saddle polyhedra can be placed. This non-periodic arrangement will require additional saddle polyhedra to fill space without gaps. It is easy to visualize these infill saddle modules by replacing r rhombohedra around any vertex by r saddle hexaqons which will make a saddle polyhedron. Interesting examples of non-periodic space fillings of saddle polyhedra are from icosahedral symmetry. The n=6 case uses two saddle polyhedra of the type 114, the n=10 and 15 cases use 5 and 14 types of saddle modules 114. Other examples using combinations of saddle zonohedra, for example 114, 115, and 116, with several variants of 114, in a non-periodic arrangement. These space fillings can produce continuous modular surfaces where the saddles can be combined with space frames. Saddle faces in tension can help stabilize non-rigid space frames, thereby combining the function of enclosing or covering space with structural stability.

The polyhedral stars can be converted into pyramidal stars, and hence all examples corresponding to FIGS. 4–7 can be derived from these. But here these may not have a planar layered arrangement, the layers will themselves undulate. One correspondence of the arbitrary 6-star 93 to an equivalent irregular pyramidal star is shown in 93a and 93b. In 93a, all the six vectors have made convex by extending vectors ii and iii across the star center to become vectors ii' and iii'. Joining the vectors produces a star of vectors in the shape of an irregular pentagonal pyramid, where the vectors i, ii', iv, iii', and vi may be non-planar. This pyramidal star begins to resemble the pyramidal stars we saw earlier in 7–12, 25–29, and 45–49. It is easy to imagine deriving irregular variants of the planar periodic and non-periodic arrangements based on an arbitrary polyhedral star. Interesting variants of this kind would be possible from the vector stars of regular and semi-regular polyhedra with n greater than 4.

From the space-fillings of rhombohedra and zonohedra based on any of the n-stars described so far, the present invention discloses another class of curved space structures composed of saddle polygons. These are continuous curved surfaces, known as "curved space labyrinths". These are a special class of continuous curved surfaces that divide space into two non-intersecting spaces that are intertwined. As in the case of saddle structures described so far, where saddle polyhedra, planar arrays of saddle polygons, and space-fillings of saddle polyhedra were disclosed, here too a similar sequence is followed whereby a common principle of generating curved labyrinths is applied to rhombohedra and zonohedra, planar arrays of rhombii and zonogons, and space-fillings of rhombohedra and zonohedra. And as before, the curved space labyrinths disclosed here are periodic and non-periodic surfaces.

Figure 12:
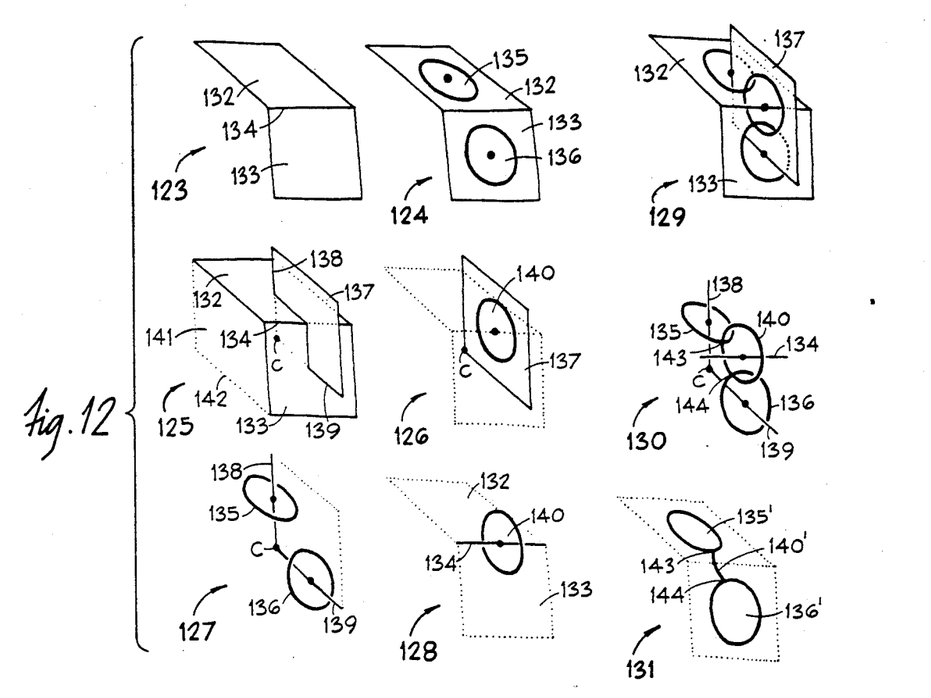
FIG. 12 shows the concept of deriving the edges, and hence the of a curved space labyrinth.

The principle is described in FIG. 12. 123 shows two rhombii 132 and 133 meeting at the edge 134. These two rhombii could be faces of any zonohedron, any plane-fillings of rhombii, or any space-filling or rhombohedra and zonohedra. Further, the rhombii could be parallelograms. In 124, closed polygons 135 and 136 are inscribed on the faces 132 and 133. In the illustration, the centers of the polygon and the rhombii are shown as being the same, and the closed polygons are shown as ellipses. In 125, a radial plane 137 is introduced. It is shown as being parallel to the rhombus 141, shown in dotted line, which is defined by the two rhombii 132 and 133, and the three rhombii can be visualized as the faces of a rhombohedron 142. The illustration also shows the radial plane 137 sharing the center C of the rhombohedron, thereby bisecting the edge 134. The edge 134 is the dual of the plane 137. There is another pair of duals in this illustration: the radial edges 138 and 139, belonging to the radial plane 137, are the duals of the original rhombii 132 and 133.

This notion of duality is important and is further clarified in the subsequent illustrations. In 126, an ellipse 140 is inscribed on the dual plane 137, such that it shares its center with the rhombus. If the edges are seen as vectors, the two ellipses 135 and 136 are dual to the radial pair of vectors 138 and 139, as shown in 127, and the edge vector 134 is dual to the dual ellipse as shown in 128. In general, the vectors 138 and 139 define one space network, and it is dual to the vector 134 which defines another space network. The network defined by the edge 134 is that defined by the edges of space-fillings of rhombohedra and zonohedra, which is the starting point as disclosed here.

The last important step in generating the labyrinth is shown in 129–131. The two earlier diagrams 124 and 126 are superimposed in 129. The dual networks of vectors shown earlier in 127 and 128 are superimposed in 130. The dual ellipses touch at two points 143 and 144. The beginnings of the labyrinth are shown in 131. All ellipses have become openings, two of which are shown as 135' and 136', and the dual opening from the dual ellipse 140 is not shown. But instead, a portion 140' of this ellipse is shown. 140' is the curved edge of the labyrinth. The two points 143 and 144 where the two dual openings meet are two vertices of the labyrinth.

Figure 13:
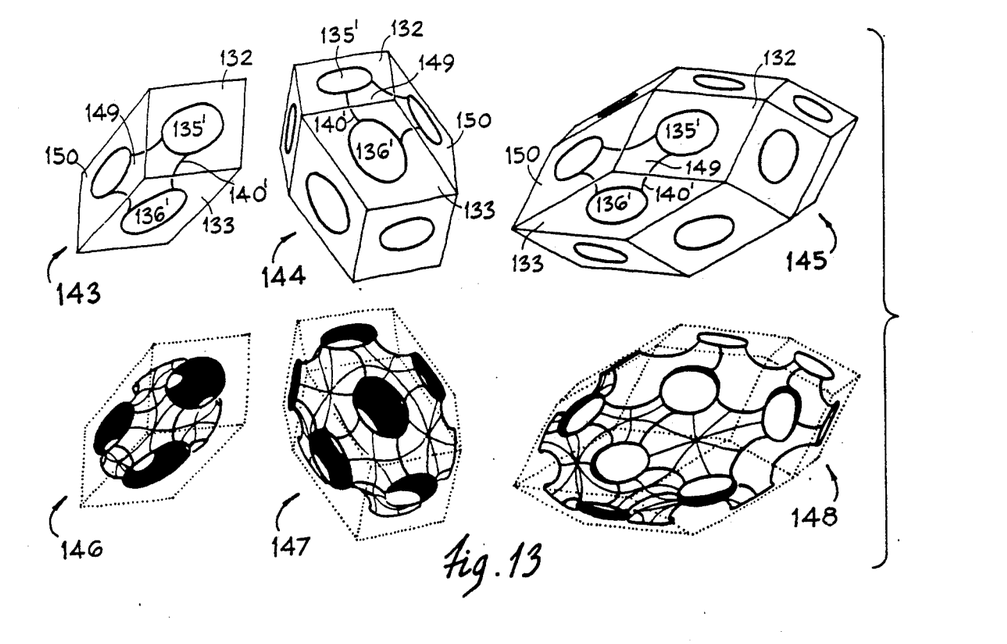
FIG. 13 the derivation of three saddle zonohedra with a cur like surface.

From this beginning, it is simple to derive the entire surface. The entire procedure of FIG. 12 is carried out over each pair of adjacent rhombii. Three examples of curved zonohedral modules obtained this way are shown in FIG. 13. Three zonohedra with p=3, 4, and 5 are shown in 143–145. The procedure of FIG. 12 is applied to one tri-valent vertex in each case. In each case, two openings 135' and 136' are obtained from two adjacent rhombii 132 and 133 as before, the edge 140' lying on the dual ellipse is also indicated. The procedure is applied to the pair of rhombii 132 and 150, and then to the pair 133 and 150. What results is a saddle hexagon 149 with six curved edges, where three alternating edges lie on the rhombic faces of the zonohedron, and remaining three alternate edges lie on the dual planes. The saddle hexagon 149 is one face of the labyrinth with its edges and vertices being defined by the intersection of two sets of dual openings. When this procedure is applied to every vertex of the zonohedron, a saddle polyhedron having a set of saddle faces corresponding to the vertices of the zonohedron, and another set of open plane faces or openings corresponding to the faces of the zonohedron is produced. The three saddle polyhedra 146–148, corresponding to the zonohedra 143–145 are shown. Every v-valent vertex is replaced by a 2v-sided saddle polygon, as in the saddle zonohedra 114–126.

It is clear that numerous variations of such saddle zonohedra with holes are possible. The openings, and hence the edges of these structures, could be any suitable convex or non-polygon with curved or straight edges. Every pair of adjacent rhombii in any zonohedron could be thought of as two faces of "hidden" rhombohedron, as shown earlier in 125 with the rhombohedron 142, and the dual plane could be directed towards the center of this rhombohedron as in FIG. 12, or it could be tilted at an angle towards the center of the zonohedron. In space-fillings, the method of FIG. 12 would produce a warped radial plane. Here, the dual openings of the labyrinth will have warped boundaries. In space-fillings, the dual plane could be determined by a plane bound by the edges which join the centroids of each pair of neighboring cells around an edge. In this case, the polygons 135 and 136 shown in FIG. 12 will be placed off-center with respect to the rhombic face 132 and 133. In another variation, the openings on the original rhombic faces could have warped boundaries.

Figure 14:
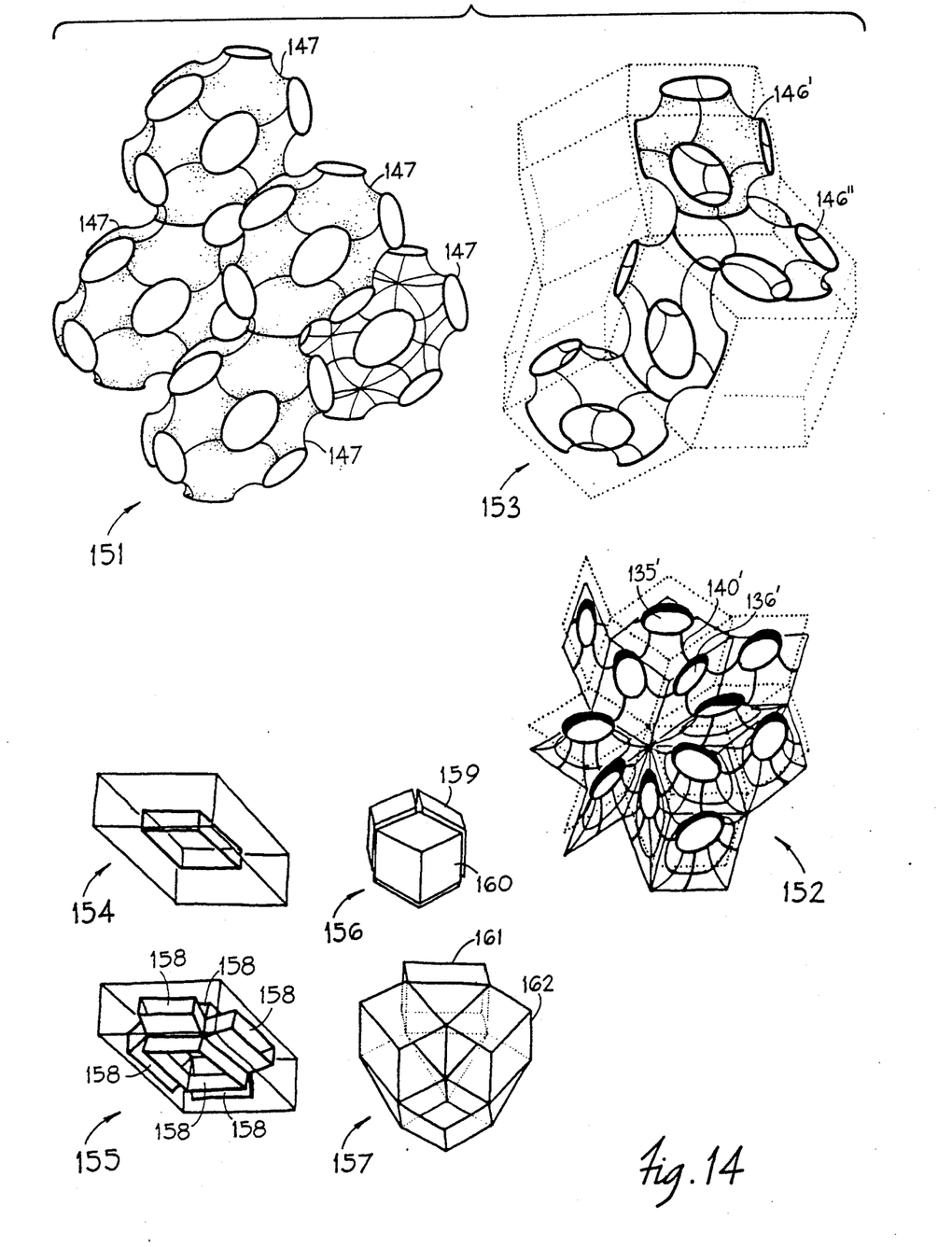
FIG. 14 shows one periodic curved space labyrinth based on the self-packing of n=4 zonohedron based on non-regular 4-star, one example of a non-periodic plane labyrinth surface based on the Penrose tiling, one example of a non-periodic curve space labyrinth based on n=6, and a plane-faced variant of the latter.

Three examples of curved space labyrinths, derived from space-fillings of rhombohedra and zonohedra, are shown in FIG. 14. array 151 is a periodic array of the module 147 based on a network having four equal vector directions and unequal angles between them. Infinite variants can be derived as in the deformations of 83 and 84 described earlier. 152 labyrinth is a non-periodic labyrinth related to the Penrose tiling where the openings 135' and 136' connected by the edge 140' correspond to the illustration 131. Shown is a single-layer from a multi-layered curved space labyrinth, where the next layer is stacked with upside-down modules, and the two layers are repeated periodically in an upward direction corresponding to the 6-star 45. An oblique variant can be derived from the oblique 6-star 47. Labyrinth 153 is a multi-directional, non-periodic labyrinth based on a 6-star, derived from an icosahedral star. Its modules are two variants 146' and 146" of the module 146. Corresponding examples can be derived for other polyhedral stars. For example, the polyhedral 15-star based on the icosidodecahedron 88 will have 14 variants of the module 146. Clearly, as in space-fillings, where rhombohedra and zonohedra fill space, the curved modules p=3, 4 and 5 shown in 146–148, along with other cells, can produce other periodic and non-periodic curved space labyrinths. The infinite class of pyramidal stars, the stars derived from regular and semi-regular polyhedra with 2n vertices and n greater than 4, and arbitrary polyhedral stars with equal or unequal vectors will produce corresponding curved space labyrinths. As in the saddle polyhedra and their space-fillings, the advantage of the present disclosure lies in that it permits any labyrinths, with any proportions, and these are not restricted by the regularity of the networks. Labyrinths based on space-fillings of polyhedra with even-sided regular faces are excluded.

Examples of plane-faced variants of the non-periodic labyrinth 153 are variants 154–157. Variant 155 is a plane-faced variant of 146″, its center is a rhombohedral hole 154 in the shape of a similar but shrunken version of the original rhombohedron. The six protruding rhombic prisms 158 protrude from the hollow center. The inclination of the prisms is along the vectors joining the centroids of the rhombohedron to its six neighbors with each of which it shares one of its faces. A continuous surface with parallelograms can be visualized by replacing each variant of 146 with a variant of 155. Alternatively, a close-packing of rhombohedra 159 and 160, shown in 156 can be exploded and new prisms 161 and 162 introduced between the two original rhombohedra. When all faces of the original rhombohedra are removed, the remaining new faces define a continuous plane-faced surface. 157 is a portion of this labyrinth. Other examples can be derived in a similar way.

What is claimed is:

1. A building system formed by a plurality of saddle polygons with even numbers of sides fitting together to make surface arrays,
   where said saddle polygons are derived from a non-planar n-star comprised of n vectors having directions and magnitudes determined by the n inclined edges of a pyramid of any height and a regular polygonal base of n equal sides of any width,
   where n is any number greater than 3,
   where said saddle polygons have their edges parallel to a p-star based on any combination of p vectors having directions and magnitudes determined by the directions and magnitudes of said n vectors,
   where p is any number greater than two and less than or equal to n,
   where the top plan view of said saddle polygons belong to a family of even-sided plane polygons derived from a planar m-star where m=n when n is odd, and m=n/2 when n is even, and
   where said plan views exclude the plurality of even-sided regular polygons.

2. A building system according to claim 1, wherein said saddle polygons form a discontinuous surface.

3. A building system according to claim 1, wherein said saddle polygons include curved areas or have curved edges.

4. A building system according to claim 1, wherein each of said plurality of saddle polygons is a convex saddle polygon.

5. A building system according to claim 1, wherein each of said plurality of saddle polygons is a non-convex polygon.

6. A building system according to claim 1, wherein said plurality of saddle polygons include both convex and non-convex polygons.

7. A building system according to claim 1, wherein said plurality of saddle polygons makes a periodic surface array.

8. A building system according to claim 1, wherein said plurality of saddle polygons makes a non-periodic surface array.

9. A building system according to claim 1, wherein said pyramid which determines the said n-star, is a non-rightangled oblique pyramid.

10. A building system according to claim 1, wherein said pyramid which determines the said n-star, is a rightangled upright pyramid.

11. A building system according to claim 1, wherein the said top plan views of the said saddle polygons are plane zonogons.

12. A building system according to claim 1, wherein the said top plan views of the said saddle polygons are plane non-convex polygons.

13. A building system according to claim 1, wherein the said saddle polygons have cut-outs in the saddle surface.

14. A building system according to claim 1, wherein the saddle polygons make a non-periodic array of rhombuses in the top plan view.

15. A building system formed by a plurality of saddle polygons with even numbers of sides fitting together to make surface arrays,
    where said saddle polygons are derived from a spatial n-star composed of n vectors having directions and magnitudes of which n−1 vectors are co-planar and radiate from the center of a regular (n−1)-sided polygon to its vertices, and the remaining vector protrudes from this plane at right angles to th n−1 vectors or at any angle to the n−1 vectors,
    where n is any number greater than 4,
    where saddle polygons have their edges parallel to a p-star based on any combination of p vectors having directions and magnitudes determined by the directions and magnitudes of said n vectors,
    where p is any number greater than two and less tan or equal to n,
    where the top plan view of said saddle polygons belong to a family of even-sided plane polygons derived from a planar m-star where m=(n−1) when m is odd, and m=(n−1)/2 when m is even, and
    where said plan views exclude the plurality of even-sided regular polygons.

16. A building system according to claim 4, wherein each of said plurality of saddle polygons is a convex saddle polygon.

17. A building system according to claim 4, wherein each of said plurality of saddle polygons is a non-convex saddle polygon.

18. A building system according to claim 4, wherein said plurality of saddle polygons include both convex and non-convex saddle polygons.

19. A building system according to claim 15, wherein said plurality of saddle polygons makes a periodic surface array.

20. A building system according to claim 15, wherein said plurality of saddle polygons makes a non-periodic surface array.

21. A building system according to claim 15, wherein the said top plan views of the said saddle polygons are plane zonogons.

22. A building system according to claim 15, wherein the said top plan views of the said saddle polygons are plane non-convex polygons.

23. A building system according to claim 15, wherein the said saddle polygons include curved areas or have curved edges.

24. A saddle polyhedral structure comprising
a plurality of convex or non-convex even-sided saddle polygons having edges based on a subdivided zonogonal prism,
wherein said saddle polygons have their said edges parallel to a spatial n-star composed of n vectors of which n−1 vectors are co-planar and radiate from the center of a regular (n−1)-sided polygon to its vertices, and the remaining vector protrudes from its plane at right angles to the n−1 vectors or at any angle to the n−1 vectors,
wherein said saddle polygons are obtained by removing edges from the said zonogonal prism and enclosing a set of contiguous edges, which define a closed polygon, by a saddle surface.

25. A saddle polyhedral structure according to claim 24 which forms a single-layered, double-layered and multi-layered space-filling composed of said saddle polygons.

* * * * *